Figure 1:
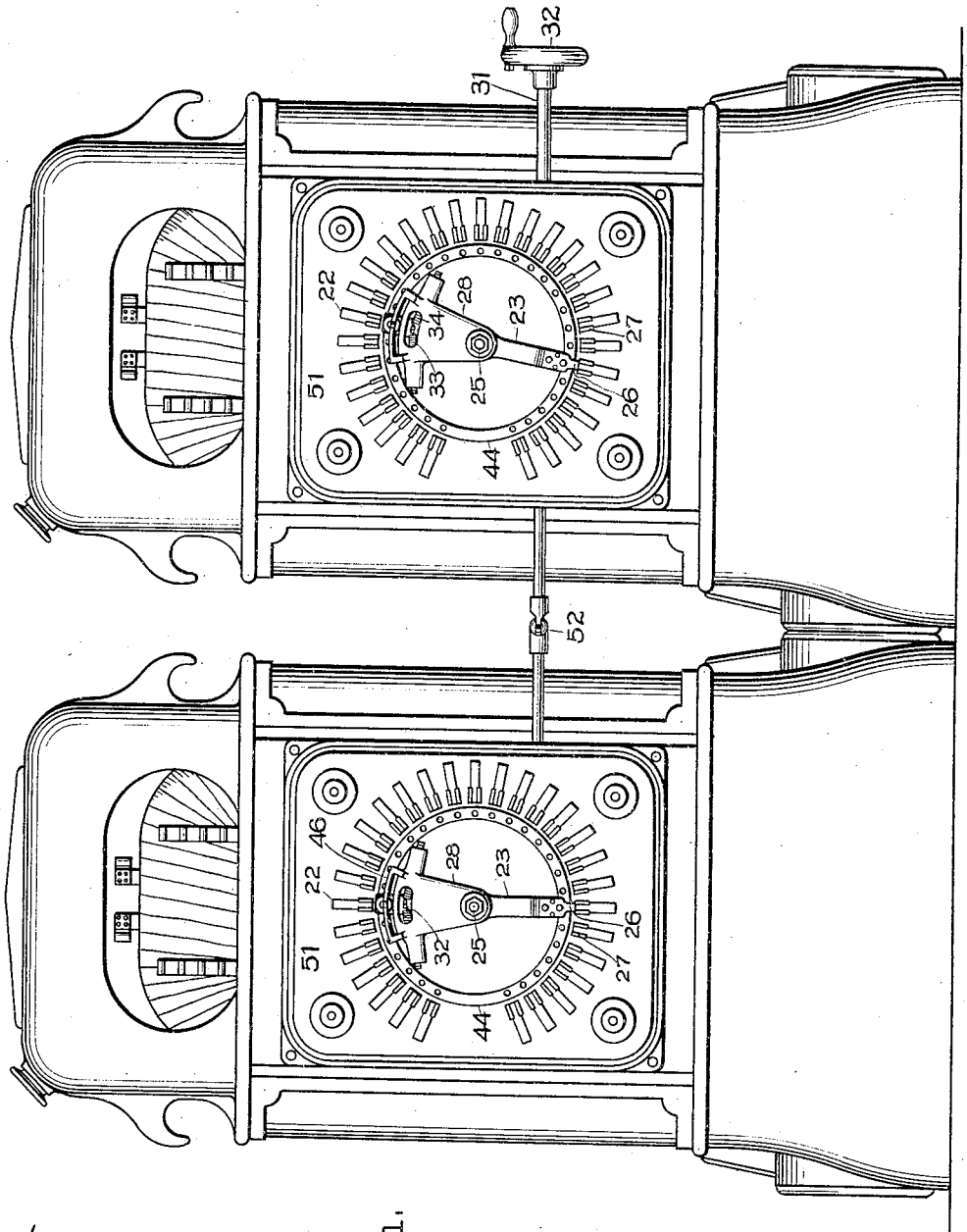

No. 769,991. PATENTED SEPT. 13, 1904.
W. L. R. EMMET.
SYSTEM OF ELECTRICAL DISTRIBUTION.
APPLICATION FILED FEB. 9, 1900.
NO MODEL. 3 SHEETS—SHEET 1.

WITNESSES.
A. H. Abell.
A. F. Macdonald.

INVENTOR.
William L. R. Emmet,
by Albert G. Davis
Atty.

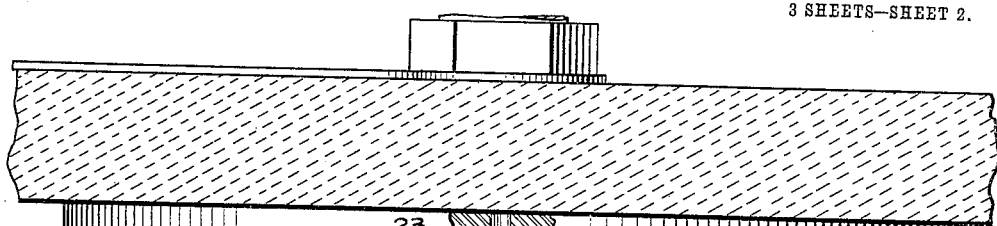
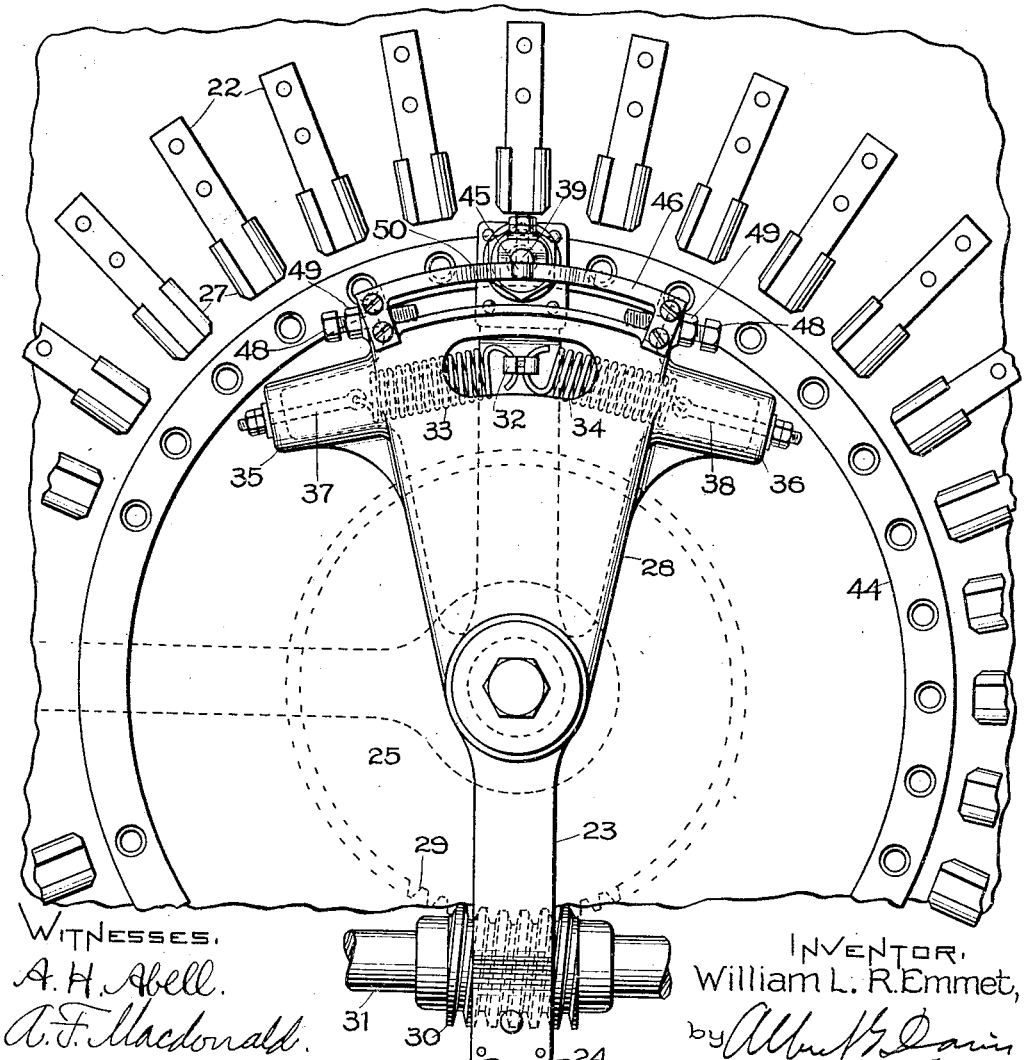

No. 769,991. PATENTED SEPT. 13, 1904.
W. L. R. EMMET.
SYSTEM OF ELECTRICAL DISTRIBUTION.
APPLICATION FILED FEB. 9, 1900.
NO MODEL. 3 SHEETS—SHEET 3.
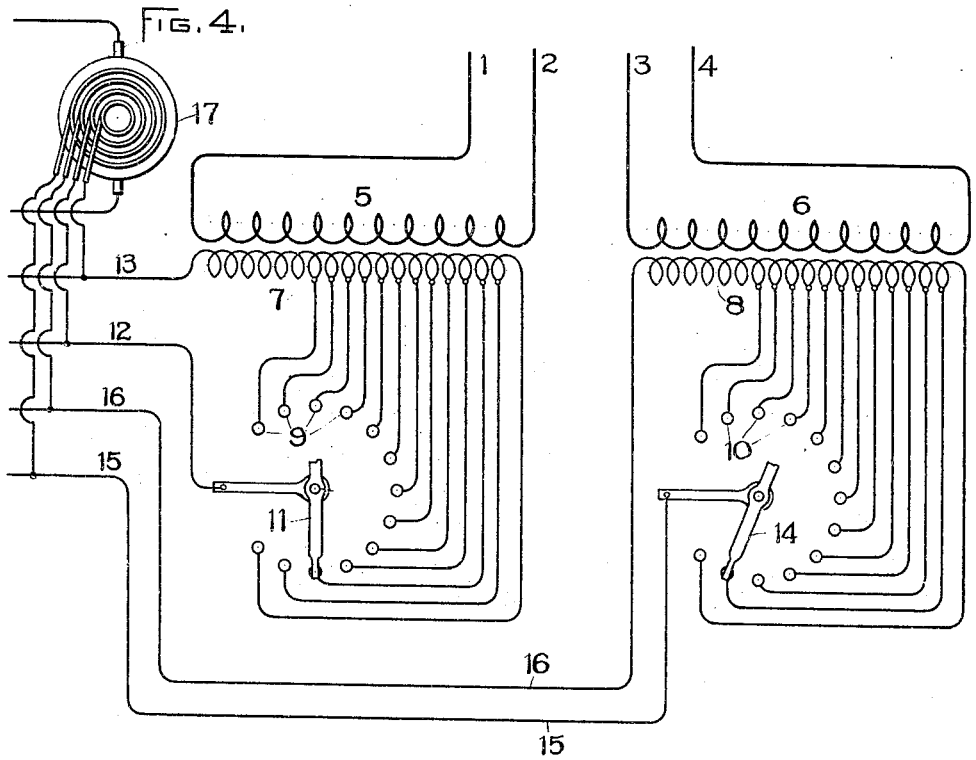
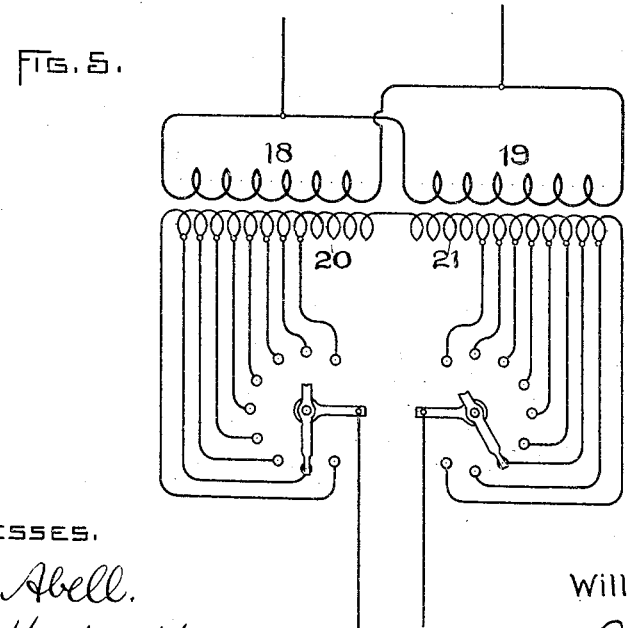
WITNESSES.
A. H. Abell.
A. F. Macdonald.
INVENTOR.
William L. R. Emmet,
by Albert G. Davis
Atty.

No. 769,991. Patented September 13, 1904.

UNITED STATES PATENT OFFICE.

WILLIAM L. R. EMMET, OF SCHENECTADY, NEW YORK, ASSIGNOR TO THE GENERAL ELECTRIC COMPANY, A CORPORATION OF NEW YORK.

SYSTEM OF ELECTRICAL DISTRIBUTION.

SPECIFICATION forming part of Letters Patent No. 769,991, dated September 13, 1904.

Application filed February 9, 1900. Serial No. 4,605. (No model.)

*To all whom it may concern:*

Be it known that I, WILLIAM L. R. EMMET, a citizen of the United States, residing at Schenectady, in the county of Schenectady and State of New York, have invented certain new and useful Improvements in Systems of Electrical Distribution, of which the following is a specification.

The invention hereinafter set forth relates to certain improvements in the regulation of multiphase alternating-current systems of distribution and to an apparatus for carrying this regulation into effect. Although particularly useful with multiphase systems, it is to be understood, however, that my invention, at least as to some of its features, is not limited to use in connection with such systems only, but is capable, on the contrary, of much broader application.

Where a multiphase circuit is used to feed a translating device—such, for example, as a rotary converter—it is often desirable to change the electromotive force of the alternating current by suitable gradations. In order to effect this result, transformers or compensators having a variable ratio between their primary and secondary electromotive forces are commonly employed. This variable ratio of electromotive forces may be obtained by subdividing the winding from which the secondary electromotive force is derived. In such cases the number of different electromotive forces obtainable has heretofore been limited to the number of subdivisions of each of the windings referred to. Where it is desired to obtain a large number of small gradations of electromotive force, this operates as a serious drawback, since it is often not convenient to put a sufficient number of turns in the winding of the compensator or transformer to give the requisite number of steps, or if the winding have a sufficient number of turns it may be troublesome and expensive to construct a switch which will handle the current and which can be fitted with the requisite number of steps. These difficulties I avoid by providing the multiphase system with transformers or compensators having subdivided windings and causing the subdivisions of the respective windings to be cut into and out of circuit dissimultaneously or in succession. Thus, for example, in a quarter-phase system the electromotive force on one side of the system is first varied, then the electromotive force on the other side, and so on. If a rotary converter were fed from this system, its direct-current voltage would be affected by each variation of electromotive force on the different sides of the quarter-phase supply system and would have a value intermediate between the values corresponding to the greater and less electromotive forces on the alternating-supply system. It will thus be seen that for each tap brought out from the alternating-current-supply winding there are two voltages on the direct-current side of the converter to correspond. In case the system is three-phase the number of gradations of voltage obtainable is three times as great as the number of steps on any transformer or compensator, as will readily be seen, while the number of steps obtainable with multiphase current of a higher order will be larger in proportion.

An important feature of my invention is the means which I employ for changing the connections from point to point in the windings of an alternating-current-supply system. In cases where divided windings have heretofore been employed considerable difficulty has arisen in the endeavor to prevent serious short circuits in changing the connections between adjacent points in the winding without at the same time breaking the main circuit. Various artifices have from time to time been employed, nearly all of which depend for their effectiveness upon limiting the amount of current set up by such short circuits. My improvement in this connection is a radical departure from the practice heretofore obtaining and consists in snapping the points of connection of the main circuit from one tap to another of a divided winding or source, so that the arc formed in passing out of engagement with one contact is not interrupted until engagement is made with the next. The arc thus preserves the continuity of the current while the circuit-changing operation is taking place and is of such low resistance that except in the case of a low-voltage circuit it produces no appreciable fluctuation in the current.

Although I have thus pointed out in a general way the nature of my invention, its points of novelty are to be determined by reference to the claims appended hereto, while for a better understanding of its details reference may be made to the following description of an embodiment of the same, taken in connection with the accompanying drawings, in which—

Figures 1, 2, and 3 are various views of a switch for carrying my invention into operation, and Figs. 4 and 5 are explanatory diagrams.

Although an apparatus operating in accordance with my invention is specifically illustrated in Figs. 1, 2, and 3, it will perhaps be better understood by first referring to diagrams 4 and 5, illustrating its mode of operation, before referring to the details of the switch itself.

Fig. 4 illustrates a two-phase alternating-current system, current being supplied over transmission-lines 1, 2, 3, and 4 to the primary windings 5 6 of suitable transforming devices, which in this instance are shown as ordinary transformers. It will of course be understood that compensators may be employed, if desired, without departing from the spirit of my invention, and therefore wherever herein I speak of a "transformer" I imply also the possible substitution of a compensator or other transforming device.

Secondary windings 7 8 are arranged in the ordinary manner in inductive relation to the primary windings 5 6, respectively. Each of these windings is subdivided by means of taps leading out to sets of fixed contacts 9 10, arranged, respectively, in arcs of circles. The number of these contacts may be chosen with regard to the necessities of the particular case in hand.

Each set of contacts has a coöperating switch-arm arranged to move over the contacts in succession, this switch-arm being electrically connected to the main circuit. The switch-arm 11 is shown in Fig. 4 as coöperating with a set of contacts 9 and is connected with the multiphase mains 12, the other conductor, 13, corresponding to this phase being connected to one end of the secondary 7. In a similar manner a switch-arm 14 coöperates with the circular row of contacts 10 and is connected to one of the conductors 15 of the other phase of the alternating-current system, the other conductor, 16, of this phase being connected to the end of the secondary 8 in a manner similar to the connection of the conductor 13 to the secondary 7 of the first phase.

The switch-arm 11 is shown as being on the third contact from the end of its set of fixed contacts, while the switch-arm 14 is shown as on the second contact from the end of its corresponding set of fixed contacts. Suitable apparatus, such as shown in Figs. 1, 2, and 3, is provided for moving these switch-arms 11 and 14 in succession, the movement being such in the case indicated in Fig. 4, for example, as to transfer the switch-arm 14 to the third contact from the end, then to transfer the switch-arm 11 to the fourth contact of its set of contacts, then to transfer the contact-arm 14 to the fourth contact of its set, and so on. In this way the voltages impressed on the multiphase mains 12, 13, 15, and 16 will first be balanced, then one will be increased so as to produce an unbalanced condition, then the other will be increased to an equality with the first, thus alternately balancing and unbalancing the system to a slight extent, at the same time progressively increasing its resultant voltage. If the system supply a rotary converter, as indicated diagrammatically at 17, the direct-current voltage of the converter will increase with each variation of voltage on its alternating-supply mains.

Fig. 5 shows the use of a double snap-switch in connection with a single-phase system. In this case two transformers 18 and 19 are connected in multiple, while the corresponding secondaries 20 and 21 are in series. The respective secondaries have their free ends connected to two sets of fixed contacts, respectively, and two contact-arms operate in connection therewith in the same manner as shown in Fig. 4. By reason of the arrangement thus shown a large number of voltage gradations may be obtained from two coöperating dial-switches of the nature indicated, thus avoiding the difficulty attendant upon the use of a single large dial-switch.

A form of switch which I have found useful in carrying out the operations thus indicated is illustrated somewhat in detail in Figs. 1 to 3, inclusive. Fig. 3 is an enlarged view of the main portion of the switch. A circularly-arranged series of fixed contacts is shown at 22 and is supposed to be connected by taps to appropriate points in the winding of a source of electromotive force. The switch-arm 23, which coöperates with these contacts, is shown as broken off at 24; but its relation to the contacts will be readily understood by reference to Fig. 1, in which the switch-arm is shown as extending from its pivot 25 toward a row of contacts and terminating in a point 26, which moves against spring projections 27, forming part of the fixed contacts. Motion is transmitted to the contact-arm 23 through a spring connection with the positively-rotated member 28, connected by means of a worm-wheel 29 and a worm 30 to a rotatable shaft 31. This shaft may be set in motion by the operator in any suitable manner—as, for instance, by the employment of a hand-wheel 32. The member 28 is mounted on the same axis with the contact-arm 23 and is in fixed relation to the worm-wheel 29, the contact-arm 23 being in movable relation to the worm-wheel 29 and freely movable with respect to the member 28 except for the restraint imposed by means of its spring connection with this member. This spring connection has a tendency to maintain the contact-arm 23 in a central position with respect to the member 28, and any suitable arrangement for effecting this result may be employed. I find it convenient, however, to connect a lug 32 on the switch-arm 23 with springs 33 and 34, attached, respectively, to hollow projections 35 36, carried by the member 28, the connections being made by means of adjustable rods 37 and 38. In order to enable energy to be stored in the springs 33 and 34 preparatory to the snapping of the switch-arm from one fixed contact to another, suitable locking means is provided for retaining the switch-arm temporarily in its various positions of rest. This locking means consists of an annulus concentrically arranged with respect to the row of fixed contacts and drilled with holes opposite each fixed contact, these holes coöperating with a locking-pin carried by the switch-arm 23. The locking-pin is shown in side elevation at 39 and is carried by a closed tube 40, somewhat resembling a stuffing-box and fixed in any suitable manner to the switch-arm 23. The pin 39 is provided with a shoulder 41, against which acts a spring 42. A bushing 43 is screwed into the sleeve 40 and serves to compress the spring, which by its pressure upon the shoulder 41 urges the pin out of the shell 40 and toward the annulus 44. A shoulder on the tube 40, operating in connection with the shoulder 41 on the pin, serves to limit the distance which the pin may project from the shell 40. The upper end of the pin 39 is provided with an antifriction-roller 45, mounted on an axis at right angles to the axis of the pin. The upper portion of the pin, against which bears one end of the roller, is flattened and lies against the outer surface of a sector-shaped cam-plate 46, carried by projecting lugs 47, integral with the free end of the member 28. Set-screws 48 pass through the outer ends of the member 28, as shown in Fig. 2, and project inwardly, so as to serve as points of engagement between the contact-arm 23 and the member 28. Check-nuts 49 serve to keep the set-screws from jarring loose.

In order to operate the switch mechanism just described, a rotating movement is communicated to the worm-wheel 29 through suitable manipulation of the hand-wheel 32, carried by the worm-shaft 31. The contact-arm 23 is normally locked in position by reason of the engagement of the locking-pin 39 with the perforated annulus 44. When, therefore, the worm-wheel 29 is rotated by the means described, the member 28 carried thereby likewise rotates and moves away from a central position with respect to the contact-arm 23, thereby putting a stress upon one or the other of the centering springs 33 34. As the member 28 moves relatively to the contact-arm 23 the antifriction-roller 45, carried by the locking-pin 39, is urged out by the cam-surface 50, which is pushed under the roller by the motion of the member 28. The locking-pin 39 is thus gradually withdrawn from its engagement with the annulus 44, and thus releases the contact-arm 23. At about the same time one of the set-screws 48 brings up against the contact-arm 23 and forces it out of its frictional engagement with one of the fixed contacts 22, whereupon being then free to move it springs forward under the influence of one of the springs 33 34, which has been previously put under stress, as described. The contact-arm 23 is thus impulsively urged into engagement with the next fixed contact and toward its middle position with respect to the member 28, thus freeing the locking-pin 39 from its engagement with the cam-surface 50. The locking-pin is then free to move and drops into the next hole in the annulus 44 in case it is urged far enough forward, and thus locks the contact-arm 23 in its new position preparatory to a repetition of the operation described. The set-screws 48 are adjusted so that the switch-arm 23 is snapped forward so that its locking-pin reaches a hole in the annulus. Further motion of the switch-arm by the operating mechanism then causes a repetition of this action. It will thus be seen that the contact carried by the contact-arm 23 is snapped from one fixed contact 27 to another, in doing which an arc is formed which preserves the continuity of the circuit while the change in connections is being made. The resistance interposed by this arc is generally so low as to have no appreciable effect upon the volume of current flowing, and owing to its short duration, due to the snapping action of the contact, its destructive influence upon the coöperating contacts is negligible.

Fig. 1 shows two transformers, each provided with a dial-switch 51 of the type described, the actuating-shafts of the switches being connected together by a flexible or universal joint 52. The coupling of the apparatus is such that the movable contacts of the switches operate dissimultaneously, so as to produce alternate or successive variations of voltage in the respective circuits controlled by the switches. The nature of this mode of regulation has been fully described in connection with Fig. 4 of the drawings, so that no further remarks in this connection are necessary.

Although for the purpose of making clear the nature and mode of operation of my invention I have described specifically an embodiment of the same which I at present believe to be most useful in practice, I do not, therefore, wish to be limited in the construction of my claims to the particular organization and relation of parts shown, but, on the contrary, I desire that as broad a construction as possible shall be given to my claims consistent with the state of the art.

What I claim as new, and desire to secure by Letters Patent of the United States, is—

1. The combination of a plurality of dial-switches having a quick break action, an operating-shaft for each switch, and connecting means for securing simultaneous rotation of said shafts and dissimultaneous operation of the switches.

2. The combination of a plurality of step-by-step switches, means for giving a quick break action to each switch, and means for dissimultaneously operating said switches.

3. The combination of a plurality of transformers, a set of stationary contacts for each transformer, connections between each transformer and its respective set of contacts, a movable contact coöperatively arranged with respect to each set of stationary contacts, and connections between the movable contacts for causing a dissimultaneous motion of the movable contacts.

4. The combination of a plurality of transformers, a set of stationary contacts for each transformer, connections between each transformer and its respective set of contacts, a movable contact coöperatively arranged with respect to each set of stationary contacts, and connections between the movable contacts for causing a successive motion of the movable contacts.

5. The combination of a plurality of transformers, a set of stationary contacts for each transformer, connections between each transformer and its respective set of contacts, a movable contact coöperatively arranged with respect to each set of stationary contacts, and means for causing a change of connections due to motion of one of said movable contacts to take place dissimultaneously with respect to change of connections due to motion of another movable contact.

6. The combination of a plurality of transformers, a set of stationary contacts for each transformer, connections between each transformer and its respective set of contacts, a movable contact coöperatively arranged with respect to each set of stationary contacts, and means for causing a change of connections due to motion of one of said movable contacts to take place alternately with respect to change of connections due to motion of another movable contact.

7. The combination of a plurality of sets of annularly-arranged stationary contacts, a coöperating contact-arm for each set, and means for causing the contact-arms to snap dissimultaneously from stationary contact to stationary contact.

8. The combination of a plurality of sets of annularly-arranged stationary contacts, a coöperating contact-arm for each set, and means for causing the contact-arms to snap from stationary contact to stationary contact.

9. The combination of a source of multiphase current, a rotary converter fed thereby, and means for successively varying the electromotive forces impressed upon the converter by the several phases of the multiphase current.

10. The combination of a set of fixed contacts, means for maintaining said contacts at different potentials respectively, a movable contact coöperatively arranged with respect to said fixed contacts, and means for causing the movable contact to snap from one fixed contact to another.

11. The combination of sets of contacts, a relatively movable coöperating contact-arm for each set, and means for causing the contact-arms to snap dissimultaneously over their coöperating contacts.

12. The combination of a set of contacts, a relatively movable contact coöperating therewith, means for causing the relatively movable contact to move intermittently over said sets of contacts, and means for locking said relatively movable contact in various positions.

In witness whereof I have hereunto set my hand this 6th day of February, 1900.

WILLIAM L. R. EMMET.

Witnesses:
   BENJAMIN B. HULL,
   MABEL E. JACOBSON.